United States Patent [19]
Schwartz

[11] Patent Number: 5,883,882
[45] Date of Patent: Mar. 16, 1999

[54] FAULT DETECTION IN A FREQUENCY DUPLEXED SYSTEM

[75] Inventor: Adam L. Schwartz, Berkeley, Calif.

[73] Assignee: LGC Wireless, Berkeley, Calif.

[21] Appl. No.: 791,689

[22] Filed: Jan. 30, 1997

[51] Int. Cl.$^6$ .................................................. H04L 1/24
[52] U.S. Cl. ........................ 370/243; 370/279; 370/281; 370/293
[58] Field of Search ................................. 370/241, 242, 370/243, 247, 246, 279, 281, 293, 226; 371/20.2, 20.3

[56] References Cited

U.S. PATENT DOCUMENTS

| | | | |
|---|---|---|---|
| 3,586,968 | 6/1971 | Barjot et al. | 324/52 |
| 3,733,430 | 5/1973 | Thompson | 178/5.1 |
| 4,642,426 | 2/1987 | Blackburn | 370/243 |
| 4,733,223 | 3/1988 | Gilbert | 340/505 |

*Primary Examiner*—Melvin Marcelo
*Assistant Examiner*—Alexzander Boakye
*Attorney, Agent, or Firm*—Lumen Intellectual Property Services

[57] ABSTRACT

A frequency band, or test band, located between the uplink and downlink frequency bands of a distributed, frequency duplexed network is used in a novel way to isolate block-level faults within the network. A test signal having frequencies within the test signal band is generated and fed into a downlink path of a branch of the communication network. When the test signal encounters a remote station having duplexing means, the test signal leaks through the duplexing means into an uplink path of the remote station. This occurs because the real filters of the duplexing means do not work perfectly, frequencies outside of the uplink and downlink bands, especially those in the test signal band, will leak through its components. The amount of attenuation of the test signal in leaking through the communication station indicates the operability status of the components therein. By monitoring the power level of the test signal in the uplink and downlink paths of the branch, faults can be quickly isolated.

32 Claims, 10 Drawing Sheets

FAULT DETECTION IN A FREQUENCY DUPLEXED SYSTEM

FIELD OF THE INVENTION

This invention relates generally to bi-directional, frequency duplexed communication systems. More particularly, it relates to detecting faulty block components in a distributed communication network.

BACKGROUND OF THE INVENTION

Figure 1:
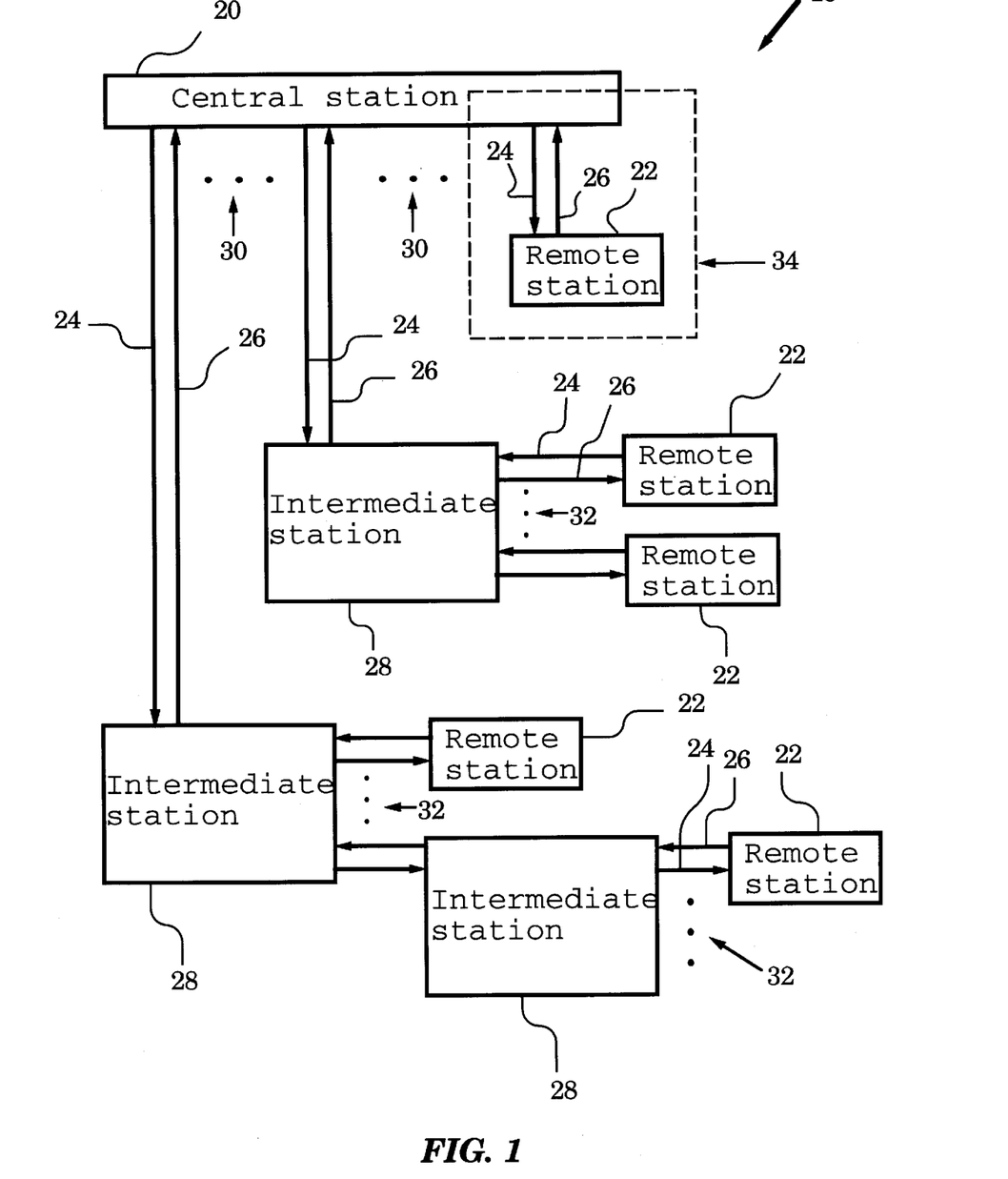
FIG. 1 is schematic of a bi-directional communication system having tree topology and frequency duplex operation.

A frequency duplexed system provides a common form of bi-directional communication. In a frequency duplexed system, separate frequency bands are used for the transmission of information flowing in opposite directions of a bi-directional link. FIG. 1 shows how a network of such links is typically employed to provide radio frequency (RF) distribution. A bi-directional central station receives all signals from the outside world to be distributed over the network. The network might, for example, provide radio coverage within various rooms of a building structure. Likewise all signals that are initiated at the network's bi-directional links (called remote stations), are fed through the network to be re-broadcasted to the outside world through the central station. Further, intermediate stations provide bi-directional branching points within the network. Such a system is highly advantageous for providing wireless two-way communication service especially within structures or around other obstacles, man-made or natural, which otherwise tend to block or disrupt radio waves.

It is evident that such networks can get relatively large with extensive branching and having many remote stations. This can make it difficult to locate sources of faults or problems when the network is not working properly. For example, when a component within an intermediate station or a remote station malfunctions it can cause problems which can propagate throughout large portions of the network. Ideally, one would like to have an efficient fault detection scheme that would detect faults and indicate which station has the faulty component. Once isolated, that faulty station can be replaced (more often than not, it is most cost effective to replace a broken station rather than spend time and money to find and fix a component within a circuit board of a station). The fault detection system should be easy to implement and independent of the specific realization of the communication network.

Such an error detection scheme should be inexpensive to incorporate and require minimal or no additional cabling. For example, suppose a bi-directional communication system were implemented over a 10 base T cable. The cable is inexpensive, is common and pre-existing to much building infrastructure and contains four twisted pair cables, two of which are used for bi-directional communication. For this system, an error detection scheme which could be implemented over one of the remaining twisted pair cables would be highly desirable as no new cabling would need to be installed. For this to be done with one cable it is desirable, if not necessary, that each station report its status (operability) over one wire. Or better yet a fault detection method should not even need this extra wire, but make use of the up- and down- link wires to simultaneously flag errors.

Although the prior art has addressed fault detection for distributed communication systems, the solutions tend to be complicated and, hence, expensive and in some respects incomplete. For example, in U.S. Pat. No. 4,733,223, Gilbert describes a method for monitoring the operational status of CATV components remotely located along a cable system. Each remote component is given a fixed address code. Using this address, a head-end system individually polls the remote components to check their status. When polled, the remote component reports its status using a low-frequency (LF) modulated signal superimposed on the power line. This LF signal is received and re-transmitted by upstream components located between the polled component and the head-end system. However, in this system the cable signals travel only downstream, not bi-directionally, and the status signals are specially coded and travel upstream. Furthermore, each component is responsible for determining its own fault status, yet Gilbert does not teach how this is done.

In U.S. Pat. No. 3,733,430, Thompson and Schoenbeck teach a method for remotely interrogating and monitoring the operation of television sets in a cable TV system for the purpose of identifying the on/off time of the television set and the channel to which the set is tuned. Furthermore, the invention aims to provide such interrogation and monitoring in a relatively short period of time. The operation of this invention uses FM modulated signals to transmit digital information. The digital information includes an address for the purpose of selecting individual remote sites. Each remote site must store and, when requested, transmit any required data. The signals transmitted to and received from the remote sites are separated in frequency and only one address may be interrogated at a time in this architecture. Again such a system is complicated and expensive, and not directed towards bi-directional, frequency duplexed communication system. In addition, this patent does not teach how a malfunctioning TV set or remote station appropriately discovers its faulty condition. Ideally, a malfunctioning station should automatically report its status without having to be polled.

U.S. Pat. No. 3,586,968 provides a means for determining the physical location of faults along a transmission line with multiple repeaters placed along the line. The invention is specifically intended for use in a cable PCM (Pulse Code Modulated) communication system. However, the existence of a fault must be know a priori, e.g., the fault could be made known by a customer complaint. The invention works by having a pulse generator at each possible fault point (each repeater) send back pulses to the original transmission source. The transmission source then detects the amplitude and time delay of the pulse in order to determine the fault location.

OBJECTS AND ADVANTAGES OF THE INVENTION

Accordingly, it is a primary object of the present invention to provide a method and system for detecting and diagnosing problems in a distributed, bi-directional communication system relying on frequency duplex operation.

It is a specific object of the present invention to provide a simple method to detect faults and locate malfunctioning communication stations within a network for distributed communication. It is an additional object of the invention to provide a diagnostic system in which communication stations self-report their operability status.

It is a further object of the invention to provide such a fault detection system which in addition is not complicated, could be readily incorporated in pre-existing communication systems without adding additional network cable, and is easily installed.

SUMMARY OF THE INVENTION

These objects and advantages are attained by a novel use of the frequency band, or test signal band, located between the uplink frequency band and the downlink frequency band. A test signal having frequencies within the test signal band is generated and fed into the downlink path of a branch of the communication network. The test signal travels until it encounters a coupling means. This coupling means is most often the up- and down- link amplifiers, filters, and duplexer contained in a remote station. These components are of the type ordinarily found in a remote station of a frequency duplexed communication system or network and no modifications of them are required by this invention.

As with all real world filters and duplexers, the remote communication stations's components are not perfect, especially in the test signal band region, and the test signal will leak from the downlink path through the components of the remote communication station and into the uplink path. The test signal in the uplink path will have undergone some attenuation by an amount determined by the coupling means components. If the components fail then the attenuation of the test signal changes. By monitoring the test signal, preferably the power level, at various locations along the uplink and downlink connections one can determine when and where a fault occurs.

A method for locating the faults within the branch is taught. In one embodiment indicators near the upper most or principal communication station in a branch indicate which sub-branch has a fault. Similarly, indicators near the upper most communication station of that sub-branch indicate which sub-sub-branch has the fault. By following these indicators down the tree-like levels of sub-branches one quickly locates the faulty communication station.

DETAILED DESCRIPTION

As previously stated, the main purpose of this invention is to provide a method for performing a system wide diagnosis for bi-directional, frequency duplexed communication systems. To this end, this detailed description begins with a discussion of the most relevant aspects of such systems to which this invention pertains.

FIG. 1 is a block diagram of a distributed, bi-directional communication system 18. All downlink signals originate at a central station 20 and are distributed throughout the system to remote stations 22. For example, central station 20 may comprise a main antenna on top of a building structure, which receive signals from the outside world and downlinks them throughout the network to individual rooms within the building containing individual remote stations 22. Remote stations 22 have antennas or other means to re-transmit or otherwise communicate the downlink signals. Commonly, the re-transmitted signals are received by a cellular phone held by a user in the vicinity of a remote station antenna. An uplink signal originating at any of remote stations 22 is fed back through the system to central station 20. It is noted that the present invention is applicable to a wide variety of types of bi-directional, frequency duplexed systems and is not limted to this example.

The specific nature of the preferred distribution network is as follows. A pair of cables comprising a downlink cable 24 and uplink cable 26 connect central station 20 directly to any number of intermediate stations 28 and/or remote stations 22. This is indicated by dots 30 in FIG. 1. Intermediate stations 28, preferably are repeaters and likewise have pairs of downlink cable 24 and uplink cable 26 which in turn connect to any number of other intermediate stations 28 and/or remote stations 22. This is indicated by dots 32. Preferably, a branch such as branch 34 of the network which connects to a remote station 22 will terminate thereon and branches connecting to intermediate stations do not terminate thereon. Furthermore, the network branches much like a tree in that there is a unique path connecting each remote station with central station 20.

Figure 2:
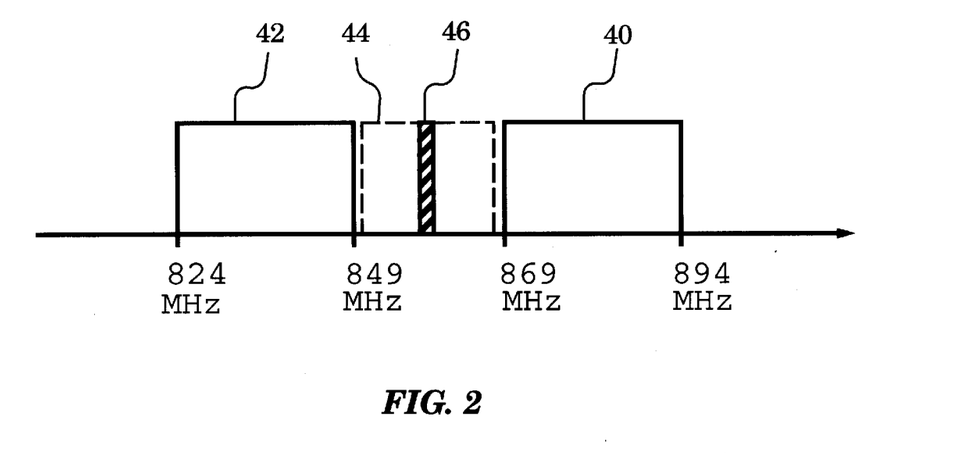
FIG. 2 is an illustration of an uplink band, a test band having a test signal, and a downlink band according to the invention.

Since the method or system of fault detection or diagnostics described below takes advantage of the properties, in fact idiosyncrasies, found in existing frequency duplexed technology a further description of signal transmission is now given. In a frequency duplexed system, such as 18, separate frequency bands are used for uplink and downlink transmission. FIG. 2 shows a downlink frequency band 40 and an uplink frequency band 42. Uplink band 42 in this example is of lower frequency than downlink band 40; further, the two bands are separated by a region 44 of unused frequencies which will be referred to as test band 44. By separating the uplink and downlink bands, full-duplexed operation is achieved without signals from one or more of the uplink channels interfering with signals on the downlink and without downlink signals interfering on the uplink.

Figure 3:
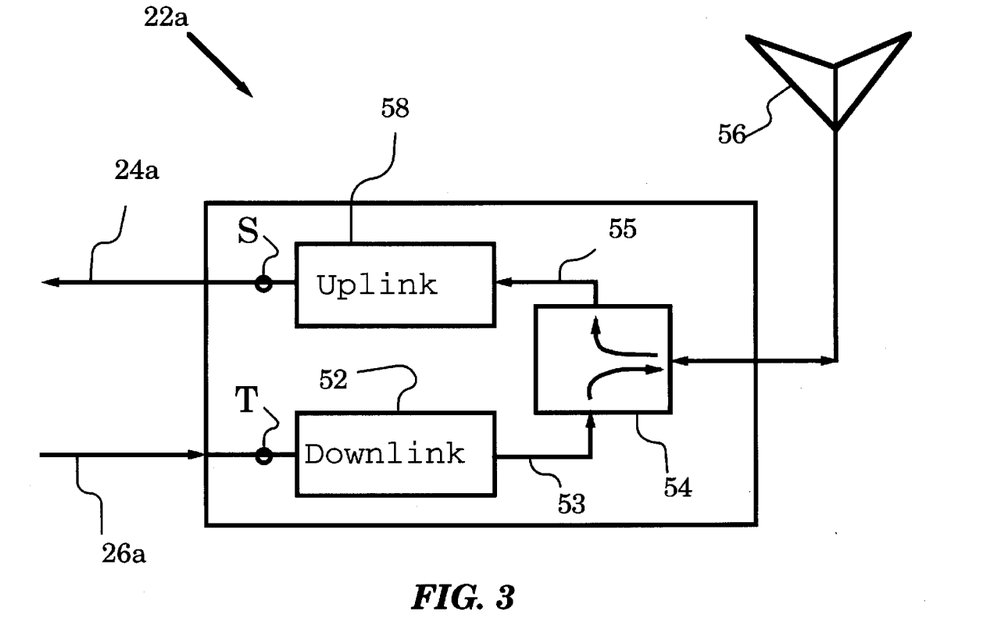
FIG. 3 is the schematics of a typical remote communication station having frequency duplex operation.

For better understanding of frequency duplex operation, a block diagram of a remote station 22a is given in FIG. 3. The station 22a is one of the remote stations 22 of system 18 and is typical of most of such remote stations facilitating bi-directional, frequency duplex communication as known in the art. Remote station 22a has a downlink connection 26a which inputs downlink signals into a downlink component block 52 which amplifies, filters and feeds the downlink signal to a duplexer 54. Duplexer 54 feeds signals contained in downlink band 40 to an antenna 56 for re-transmission. Similarly, uplink signals contained in uplink band 42 received by antenna 56 enter duplexer 54 and are directed through an uplink component block 58 for amplifying and filtering, prior to exiting through uplink connection 24a. Although remote station 22a has an antenna to support wireless communication services in the vicinity of the remote station 22a, other communication support means can readily be implemented. For example duplexer 54 could feed signals into any of a number of communication interfaces.

Ideally, the downlink system response should pass only those signals in downlink band 40 and the uplink response should pass only those signals in uplink band 42. Because of the non-ideal nature, or realistic behavior, of the uplink and downlink component blocks 58, 52, respectively, and duplexer 54 this is only approximately the case; in fact, a skilled artisan knows that uplink band 42 and downlink band 40 are well separated by unused band or test band 44 precisely in order to minimize the effect of this non-ideal behavior. For example, if a portion of a signal entering remote station 22a through downlink connection 26a contains frequencies which stray into unused test band 44, that component will leak within duplexer 54 to the uplink component block 58 in addition to the antenna 56.

Figure 4A:
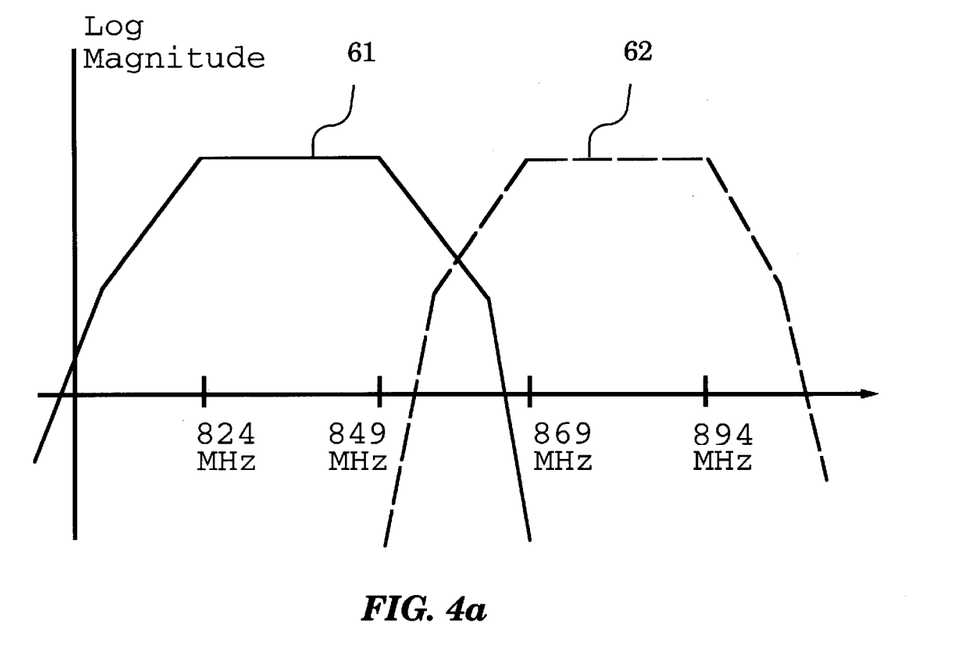
FIG. 4a is a graph of an uplink response and a downlink response of a remote communication station.

FIG. 4a further clarifies this important point. The figure shows a plot of uplink response 61 (from 54 to a point S on connection 24a in FIG. 3) and downlink response 62 (from a point T on 26a to 54 in FIG. 3) versus frequency for a typical real (non-ideal) implementation of remote station 22a. As the plots indicate downlink component block 52 and duplexer 54 will pass frequencies in downlink band 40 to antenna 56 with substantial amplitude, but in addition pass frequencies on either side of downlink band 40 with lesser amplitude. Similarly, uplink component block 58 and duplexer 54 will pass frequencies within uplink band 42 from antenna 56 to uplink connection 24a with substantial amplitude, as well as some frequencies on either side of uplink band 42 with lesser amplitude. Hence there is a region of response overlap within the unused test band 44 in which neither uplink nor downlink filtering provides significant attenuation. A test signal 46 contained in test band 44 and fed into downlink connection 24a will leak through components 52, 54, and 58, and then through uplink connection 26a. The attenuation of the magnitude of test signal 46 after leaking through the remote station in light of uplink response 61 and downlink response 62 will be given by a test band response 64 (from point T to point S in FIG. 3) shown in FIG. 4b.

Figure 4B:
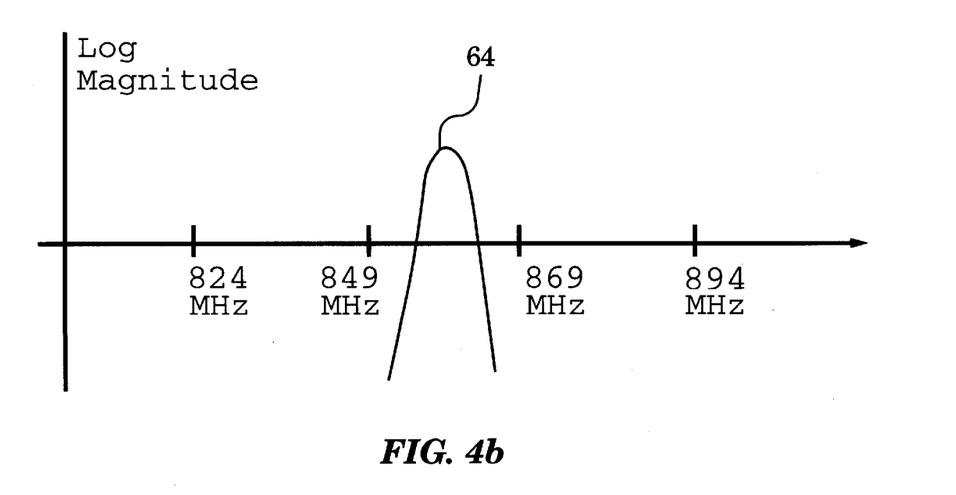
FIG. 4b is a graph of a test band response through both down- and up- links of a remote communication station according to the invention.

Not only is it not possible to build systems which entirely suppress response 64, and much effort by artisans in the field has been directed towards minimizing this effect, but for the present invention the non-zero test band response 64 is in fact desirable and necessary. The present invention takes advantage of this fact to implement a simple, effective and inexpensive system for performing diagnostics for bi-directional, frequency duplexed communication systems. The key idea of the present invention is to inject test signal 46 which is contained in test and 44 into downlink connection 24a and allow it to leak through components 52, 54, and 58, the amplitude of test signal 46 as it exits through uplink connection 26a being indicative of whether or not the remote station 22a is working properly. If the respective gains of the uplink and downlink portions of station 22a are working as expected then the attenuation of test signal 46 will be a fixed, known amount.

Test Signal Feeding

Figure 5A:
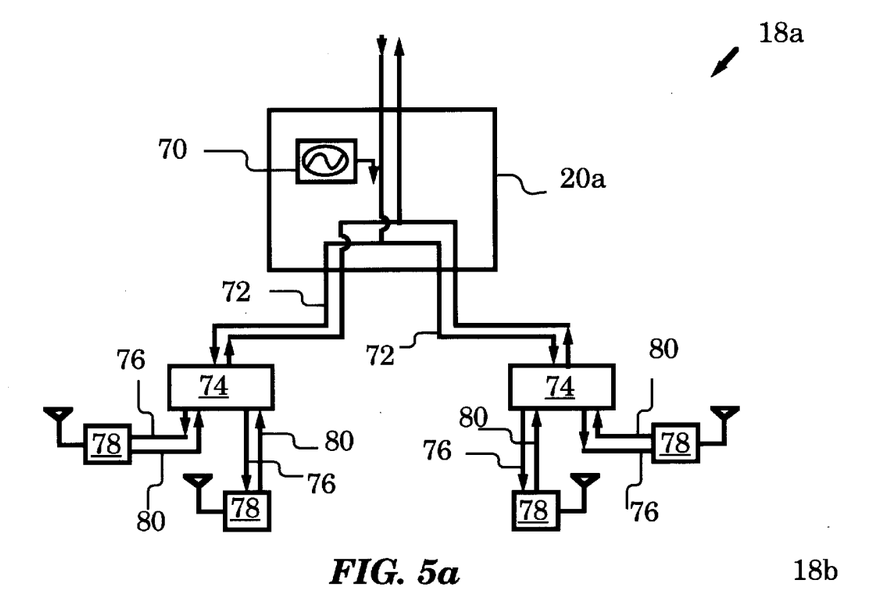
FIG. 5a is diagram illustrating the feeding of a test signal into the downlink at a central communication station.
Figure 5B:
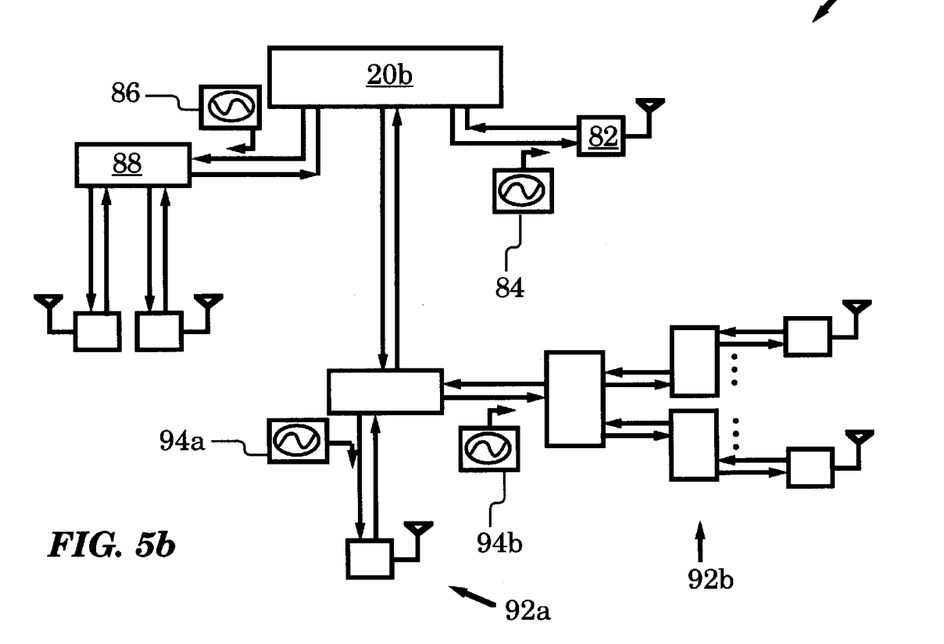
FIG. 5b is a diagram illustrating alternative locations to feed a test signal in downlink connections of a system according to the invention.

FIGS. 5a and 5b illustrate how test signal 46 can be fed into bi-directional distributed communication systems for detecting broken system components. In most cases FIG. 5a illustrates the preferable approach. A test signal generator 70 produces and feeds test signal 46 from a central station 20a of a system 18a into all downlink connections 72 which directly exit central station 20a. In this way test signal 46 will travel through all intermediate stations 74 and their respective downlink connections 76 and eventually will enter each remote station 78. The strength of each test signal 46 which leaks through each downlink connection 76 of remote stations 78 to each uplink connection 80 is then monitored, preferable at each uplink connection 80 near each remote station.

FIG. 5b illustrates various other alternate choices in a system 18b. Test signal 46 is generated by generator 84 and fed directly to a remote station 82. A second generator 86 located near a central station 20b feeds test signal 46 to an intermediate station 88. Connected directly to central station 20b, an intermediate station 90 gives rise to two network branches 92a and 92b. Branches 92a and 92b are fed test signals 46 separately by respective generators 94a and 94b. Note that the strength of signals created by generators 84, 86, 94a and 94b need not necessarily be of the same magnitude and in practice may differ. In this way system 18b effectively has four diagnostic subsystems. This might be preferable in a very large system in which there is a great length of cable between the various communication stations and it is likely that the power of test signal 46 if created at a central station would attenuate to an undetectable level by the time it arrived at the remote stations. Or perhaps in an application it is preferable that the strengths of the test signals reaching the remote stations are all about the same. This would allow for uniformity in the test signal detecting circuits needed near each remote station in that each circuit would test for the same signal strength.

Test signal 46 can be one of many possible signals. For example, the signal 46 could be, but not limited to, a single tone, multiple tones, a modulated carrier, or band limited noise. The choice of test signal 46 may depend upon specific details of a given distribution system. In some cases, the overriding consideration is producing test signal 46 with sufficient power to be detectable throughout the system while preventing distortions in the system (due to nonlinearities of the active components) and preventing violation of regulations that may be applicable to the system. For instance, in FIG. 3 remote station 22a has antenna 56 that radiates signals, and if the test band is in an FCC regulated portion of the frequency spectrum, there probably will be restrictions on the level of the test signal that can be radiated at antenna 56. In this situation, it is helpful to spread out the power of test signal 46 over as wide of a band as possible within test band 44. This problem may be more difficult to deal with in larger networks where the signal 46 is generated at a central station. In this situation short branches will receive high power signals while remote stations at the terminals of long branches will receive low power signals. As suggested by FIG. 5b and discussed above this can be handled by creating test signals 46 at multiple carefully selected stations. Alternatively, radiation of test signal 46 through an antenna can be prevented by placing an appropriate filter between the duplexer and antenna.

In some applications it may be desirable to have the test signal radiate from a remote station antenna or otherwise pass through a remote station's duplexer link to a remote site. For example, if the test signal is radiated along with the downlink signal, a device (such as a wireless phone) which commonly receives the downlink signal could also have a detection circuit for the test signal radiation. In this way the device could determine from the strength of the test signal whether the distribution system is working properly. This could be especially helpful when the device is receiving a poor quality or corrupted downlink signal and it is not certain if the fault is coming from the communication system or from beyond the system.

Fault Detection through Monitoring of Test Signal

Figure 6:
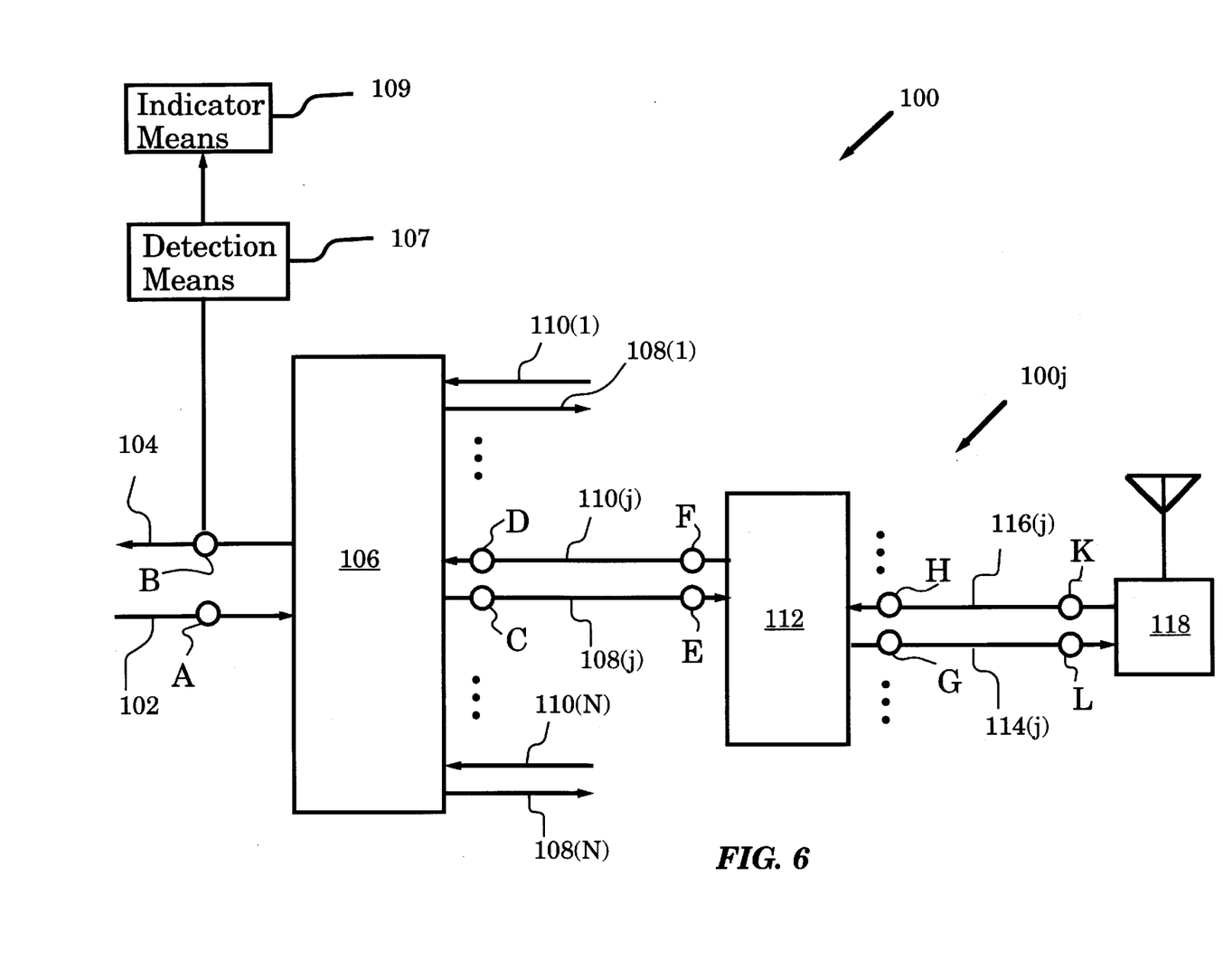
FIG. 6 is a schematic illustrating a method of fault detection in a branch of a communication network according to the invention.

We now discuss how monitoring test signal 46 at the uplink connections and downlink connections of communication stations can be used effectively to locate a problem in a tree network such as shown in FIG. 1, FIG. 5a, or FIG. 5b. We begin by discussing fault diagnostics for a branch of such a network. FIG. 6 depicts a typical branch 100. The branch has a principal downlink connection 102 and a principal uplink connection 104 to the uppermost or principal communication station 106 of branch 100. All signals entering and leaving branch 100, with the exception of signals radiated from remote stations, do so through these connections. Communication station 106 is either an intermediate station somewhere within a larger tree network or is a central station. In the latter case branch 100 is the entire network and principal connections 102 and 104 can be thought of as links to the outside world (such as connections to antennas or to a main duplexer with a subsequent connection to the outside world). In this case diagnosing faults in branch 100 corresponds to the case of fault diagnostics in an entire system.

Emanating from principal communication station 106 are a number N secondary downlink connections 108(1), . . . , 108(N) and secondary uplink connections 110(1), . . . , 110(N) which link station 106 to the remaining elements (not all shown) of branch 100. In particular downlink and uplink connections 108(j) and 110(j) service the jth sub-branch 100j of branch 100 as illustrated in FIG. 6. It is further assumed that test signal 46 is fed into branch 100 via principal downlink connection 102. If uppermost communication station 106 is an intermediate station of a larger network then a test signal generator could be placed anywhere above branch 100 on a downlink path which feeds into connection 102.

Test signal 46 will travel through station 106 and be distributed among the N secondary downlink connections 108(1), . . . , 108(N). In particular, test signal 46 travels across secondary downlink connection 108(j) to an intermediate station 112. From station 112, test signal 46 is further split among a plurality of additional downlink connections, one of which 114(j) is illustrated in FIG. 6. Test signal 46 travels across downlink connection 114(j) into a remote station 118, leaks through a duplexing means of remote station 118 and into an uplink connection 116(j). The strength of the test signal 46 reaching the uplink connection 116(j) is a measure of the operability of the various amplifying and filtering components of remote station 118. A broken or misadjusted component will change the overall attenuation of the test signal through the remote station.

Points A, B of the principal connections 102 and 104 and points C, E, G, L along downlink path 108(j) to 114(j) and points K, H, F, D along uplink path 116(j) to 110(j) indicate preferable locations to detect test signal 46 for the purpose of fault detection within branch 100. However in a given application not all locations necessarily need be checked, and of course other locations along the up- and down- link paths may be checked as well. At each location, a high impedance test signal detecting circuit or detecting means 107 is implemented (shown for point B only). Preferably detection means 107 does not substantially alter the power level of test signal 46 remaining in the up- and down- link paths. Although in some instance, as described below, it is desirable to alter the remaining test signal 46. Detecting means 107 detects preferably the power level of test signal 46, although it is contemplated that other characteristics of the test signal can be used for fault detection. In the preferred embodiment, detecting means 107 compares the detected power level with the accepted value or to a range of acceptable values for that location and outputs a substantially constant voltage signal to indicator means 109 which depends on the result of the comparison. In one preferred mode of operation, a high voltage signal indicates a fault, while no voltage or low voltage indicates proper operation. Indicator means 109 then reports either a fault or no fault status preferably via a light emitting diode (LED). Of course a variety of alternative detecting and indicating means can be implemented without straying from the scope of the present invention.

In order to determine if there has been a component failure in branch 100 it is necessary to detect the power level of test signal 46 at strategically chosen locations and judge whether or not that level is appropriate. There are two preferable modes of operation. In the first case, the net amount of attenuation or gain experienced by test signal 46 when the system is functioning properly is known at any location desired to be monitored, such as points A, B, C, D, E, F, G, H, K, L. This can be found either by directly measuring the power level of test signal 46 at these locations when the system is initially working properly, or the attenuation levels can be calculated based on knowing the test signal's attenuation per unit length of cable as well as the attenuation (or gain) within each communication station type. A sample calculation will be detailed below. Once the attenuation or gain levels are known at these locations for a properly functioning system, then the absolute power level of test signal 46 is monitored at these locations and compared to these expected levels. If the detected power at a given location differs substantially from the expected value at that location then a fault has been detected. The other preferred mode of operation will be discussed after the following detailed description of the first.

A fault detected on a point on a downlink path indicates a problem above that point, while a fault detected on a point of an uplink path indicates a fault below it on the uplink path (or on the corresponding downlink path which feeds that uplink). For further clarification, fault detection is now discussed for branch 100. Monitoring point A on the principal downlink 102 and point B on the principal uplink 104 quickly indicates whether or not branch 100 has a problem. If the power level at A differs from the expected value, then there is a problem above branch 100 leading to an improper test signal strength at A. In this case one should go up to the next higher communication station to check for faults. However if the level at A is appropriate, but the level at B is not, then there is a fault within branch 100. On the other hand if levels at A and B are both consistent with expected values, then branch 100 is not faulty.

In the event that power levels at A and B indicate a fault within branch 100 and not above, then power levels at various locations within branch 100 can then be checked to rapidly isolate faulty components. Power can be checked on secondary downlink connections 108(1), . . . , 108(N) near principal communication station 106. For example, if the power at point C on connection 108(j) is not correct, then that indicates a problem above with communication station 106 (assuming the power level at A is correct). If the power level at C is OK, but the power level at point D on corresponding secondary uplink connection 110(j) is not, then that indicates a fault within sub-branch 100j. If a problem is indicated within sub-branch 100j, then one checks the power levels, in an analogous fashion, near the next communication station along the downlink path, communication station 112. This fault detection scheme can of course be applied similarly to all other sub-branches of branch 100.

The remaining points F, E, H, G, K, L on sub-branch 100j similarly denote preferable locations to check power levels to further isolate a fault within sub-branch 100j. In particular, if power at point C is as expected, but not at point E, then that indicates a problem within the cable of secondary connection 108(J). The cable should be repaired or replaced. Points K and L located on uplink connection 116(j) is particularly advantageous for monitoring remote communication station 118. If power is as expected at point L but not at point K then that indicates a fault with station 118.

Station 188 in this case should be replaced or repaired. However monitoring station 118 at points G and H near communication station 112 also has advantages in that all the remote stations in addition to 118 can be monitored from the single location of station 112. Clearly there are many fruitful locations to monitor the power of test signal 46 and one skilled in the art can readily determine other locations of use for particular network implementations. In fact it may be desirable to do less monitoring then indicated in FIG. 6 especially for more cost constrained setups. In this case one might consider monitoring only one point on a length of cable rather than two, e.g., monitor points K and L and not H and G.

The above fault detection scheme requires knowledge of the absolute attenuation of the power level of test signal 46 throughout much of the network. This may require measuring the values once the system is working properly and constructing an individualized detection circuit to check for a possibly different power level for each of the specific test locations. For a symmetric network as in FIG. 5a this is not an issue and all detecting circuitry can be identical. But for systems as in FIG. 5b a second preferred mode of fault detection is appropriate. This mode of fault detection allows for more uniformity in the detection circuits. In this mode of operation, only knowledge of the attenuation or gain of test signal 46 through each individually component is needed and not through the network cabling. This is easily attained by measurement, i.e., sending test signal 46 of known power into the downlink connection immediately adjacent to a communication station and recording the power level of test signal 46 coming out the uplink (for example points L and K for station 118). Further this measurement is only done once for each type of communication station. Note that these measurements are independent of the size and extent of the tree network cabling and hence lead to a detection scheme well suited for implementation on networks of unknown or, at least, not predetermined sizes.

In this case, two slight modifications are needed. First, the remote and intermediate stations should block test signal 46 from passing out their respective uplinks. This is readily accomplished by a frequency diplexer which removes test signal 46 from an uplink connection prior to checking its power level to determine existence of a fault. Second, the intermediate and central stations should couple a fraction of test signal 46 from their downlink paths and inject them back through their uplink paths. With these modifications, each communication station, remote or intermediate, in the system can detect failure by comparing the power level of test signal 46 entering the station on the downlink path with the power level of test signal 46 appearing at the exit point of its uplink path. As an example, in FIG. 6 the power levels at point K and L are compared to determine if the attenuation or gain in remote station 118 is correct or not. Power levels at points A and B are compared to determine if intermediate station 106 is functioning properly.

Figure 7A:
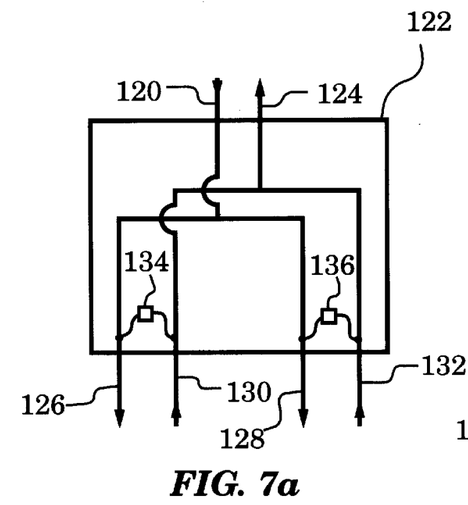
FIG. 7a illustrates a preferable approach to coupling the downlink test signal into the uplink path of an intermediate communication station according to the invention.

FIG. 7a illustrates preferable means for coupling the test signal 46 in a downlink connection 120 of an intermediate station 122 to the station's uplink connection 124. In station 122, downlink connection 120 splits into two secondary downlink connections 126 and 128 before exiting station 122. The splitting is done by a power splitter (not shown) which is discussed later. Similarly, uplink connection 124 is fed by two secondary uplink connections 130 and 132. A preferred coupling means is indicated in FIG. 7a by coupling link 134 between secondary downlink and uplink connections 126 and 130 and by coupling link 136 between similar secondary connections 128 and 132. Note that coupling links 134 and 136 connect respectively points of secondary downlink connection 126 and 128 exiting intermediate station 122 to points of secondary uplink connection 132 and 130 near their entrance to station 122. In this way a pilot signal entering station 122 at the top through downlink connection 120 will flow through links 134 and 136 to uplink connection 124 and through a greater portion of intervening electronics. Hence, the resulting test signal power in uplink connection 124 will provide a better fault or error detection than the setup of FIG. 7b.

Figure 7B:
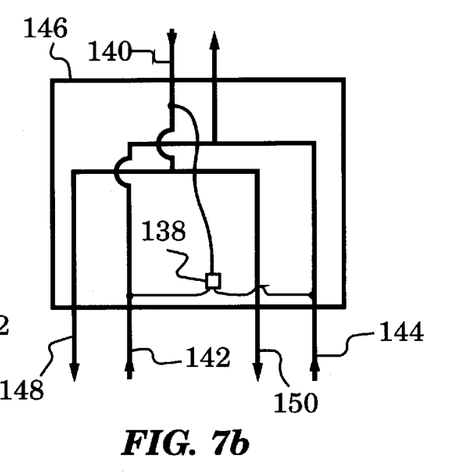
FIG. 7b illustrates an alternative approach to coupling the downlink test signal into the uplink path of an intermediate communication station according to the invention.

FIG. 7b depicts a coupling means which requires less equipment to implement, but also is less effective for fault detection. Here a coupling means is provided by coupling link 138 which takes a fraction of test signal 46 directly from a downlink connection 140 of an intermediate station 146 and feeds a portion into each secondary uplink connection 142 and 144. This coupling means will not allow for detection of faults whose source is located on the secondary downlink connections 148 and 150 as coupling link 138 allows test signal 46 to bypass these connections. However, this scheme can be advantageous in reducing the complexity of the coupling circuitry especially when an intermediate station has many secondary up- and down- link pairs.

Figure 7C:
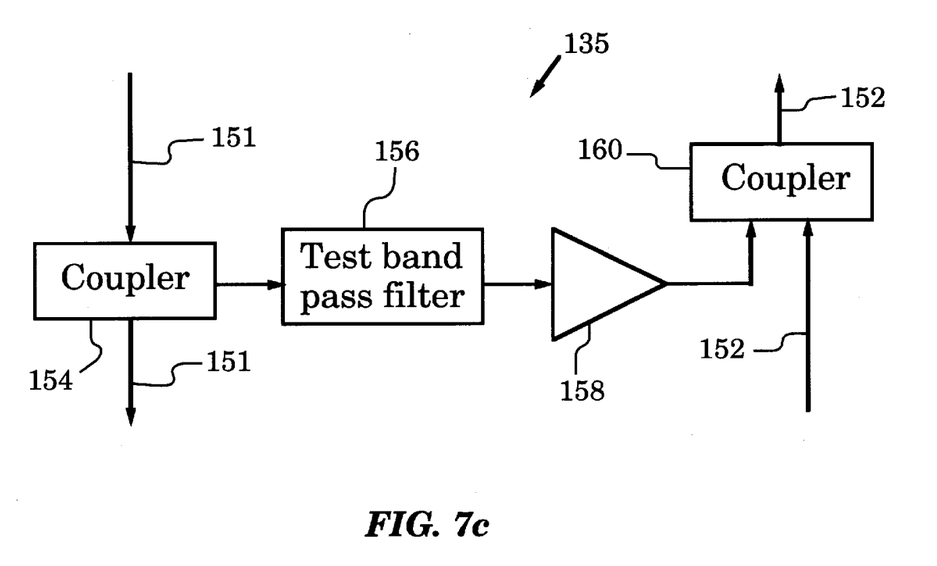
FIG. 7c illustrates circuitry which couples the downlink test signal into the uplink path of an intermediate communication station according to the invention.

FIG. 7c further teaches the details of a coupling link 135 for coupling test signal 46 of a downlink connection 150 to an uplink connection 152. A coupler 154 splits off a small fraction of signals contained in downlink 151 and passes this fraction to a test band pass filter 156. Filter 156 blocks in particular downlink band 40, allowing test signal 46 of test signal band 44 to feed through an amplifier 158 to a directional coupler 160. Amplifier 158 increases the power of test signal 46 and coupler 160 allows test signal 46 to feed upward and into uplink signals of uplink connection 152.

Now a communication station, whether intermediate, central or remote, can be diagnosed by comparing the power of test signal 46 at the station's downlink connection with its power at the station's uplink connection. Further, this comparison process depends only on components within the station and not where it is located in the network. This is especially advantageous for mass manufacture of communication components and fault detection circuitry.

Figure 8:
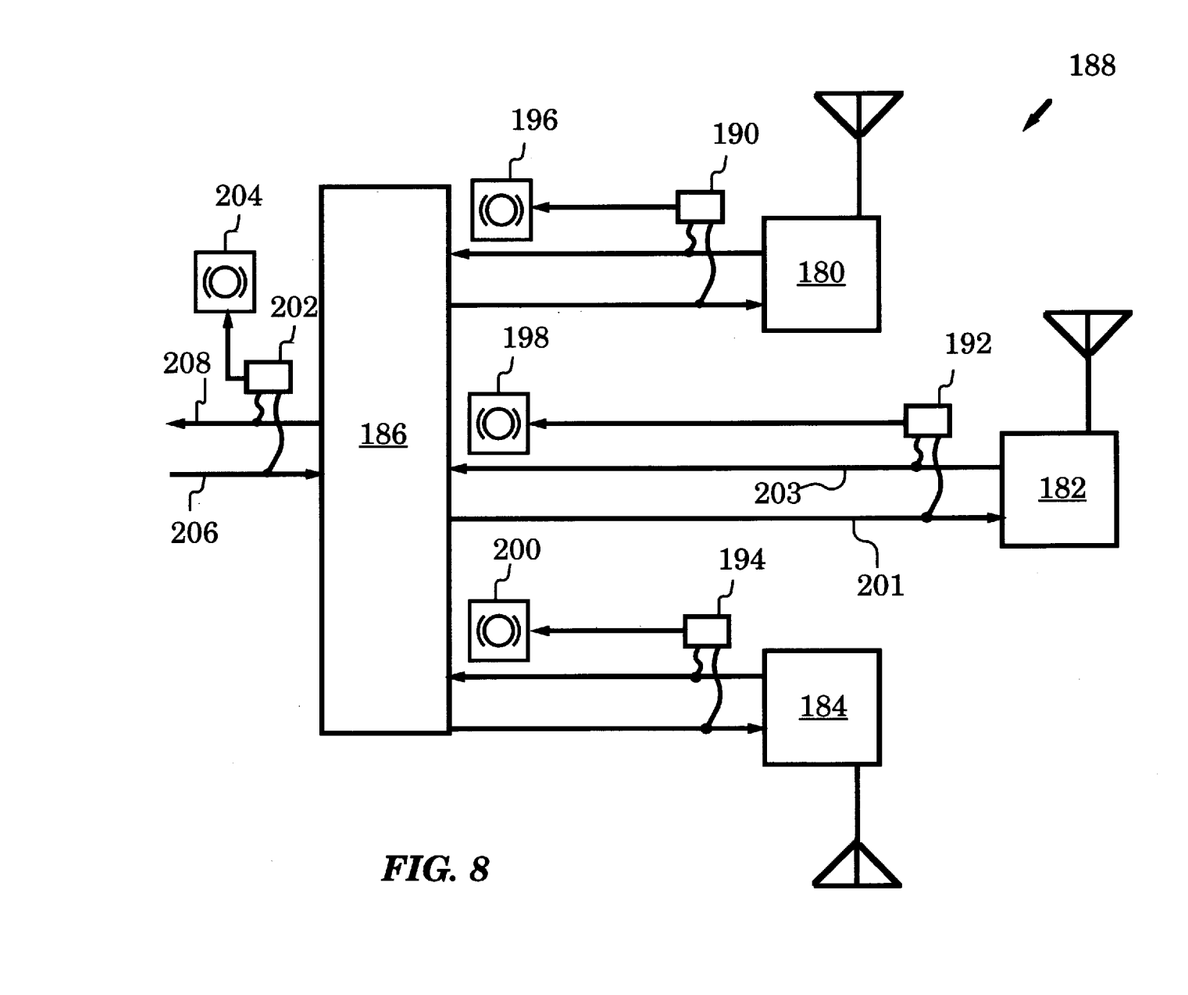
FIG. 8 illustrates a second preferable mode of fault detection according to the invention.

As yet described, this second mode of fault detection only indicates faults in particular components but does not provide a convenient means for tracking down faults. Tracking down faults is readily implemented by additional means according to this invention as illustrated in FIG. 8. Remote communication stations 180, 182, and 184 are linked to an intermediate station 186 in a branch 188 of a bi-directional frequency duplexed system (not shown) distributed over a tree network. Remote stations 180, 182, and 184 have respectively detector means 190, 192 and 194 for detecting test signal power attenuation through the remote stations. For example, detector 192 measures the power level in downlink connection 201 with high impedance circuitry ensuring test signal 46 to continue to enter station 182 with minor alteration. Detector 192 further measures the power level on the uplink connection 203, simultaneously removes test signal 46 from uplink connection 192, and divides the two measurements and compares the result to the predetermined, properly functioning attenuation value. The output of each detector 190, 192 and 194, a high constant voltage or a low voltage indicating respectively a fault or no-fault, is fed over additional cable connections 195, 197, and 199 to indicator means 196, 198, 200, respectively. Indicators 196, 198, 200 are located near intermediate station 186 and are preferably LED's which light up to indicate an error or fault in their corresponding remote stations. Intermediate station 86 similarly has a detecting means 202 and indicator 204 located on its principal downlink connection 206 and uplink connection 208 close to station 186.

Under this arrangement a technician or other individual located near station 186 can determine if there is a fault within branch 188 by observing the four LED's on indicators 196, 198, 200, 204, and in addition can determine whether a fault is caused by station 186 as indicated by indicator 204 or whether caused by stations 180, 182, or 184 as indicated by indicators 196, 198, 200, respectively. Additional fault detection means can be implemented by sending a signal from intermediate station 186 on an additional cable (not shown) to an indicator at the next higher communication station above station 186. Preferably, this cable will be set to a high voltage if any of indicators 196, 198, 200, 204 signal a fault on branch 188, otherwise the cable will maintain a low voltage. In this way indicators at any intermediate station will indicate which connected branches have faults. Once a fault is indicated on a branch then the technician follows that branch to the next lower station and so on until isolating a faulty component.

This completes the discussion of the second preferable mode of fault detection for a distributed, frequency duplexed communication system. Of course fault detection is not limited to one of these two schemes. A skilled artisan upon reading this detailed description could combine the two detection schemes in many number of ways to provide fault detection features or capabilities especially suited for individual networks given a desired level of diagnostics and/or cost constraints. In fact a specific implementation of this system is now described which combines features from the two modes of operation. Although a skilled artisan will find that the above description is completely enabling, the following materially is provided primarily to clarify the methods used to provide such systems which also satisfy FCC regulations.

Satisfying FCC Regulations

Figure 9:
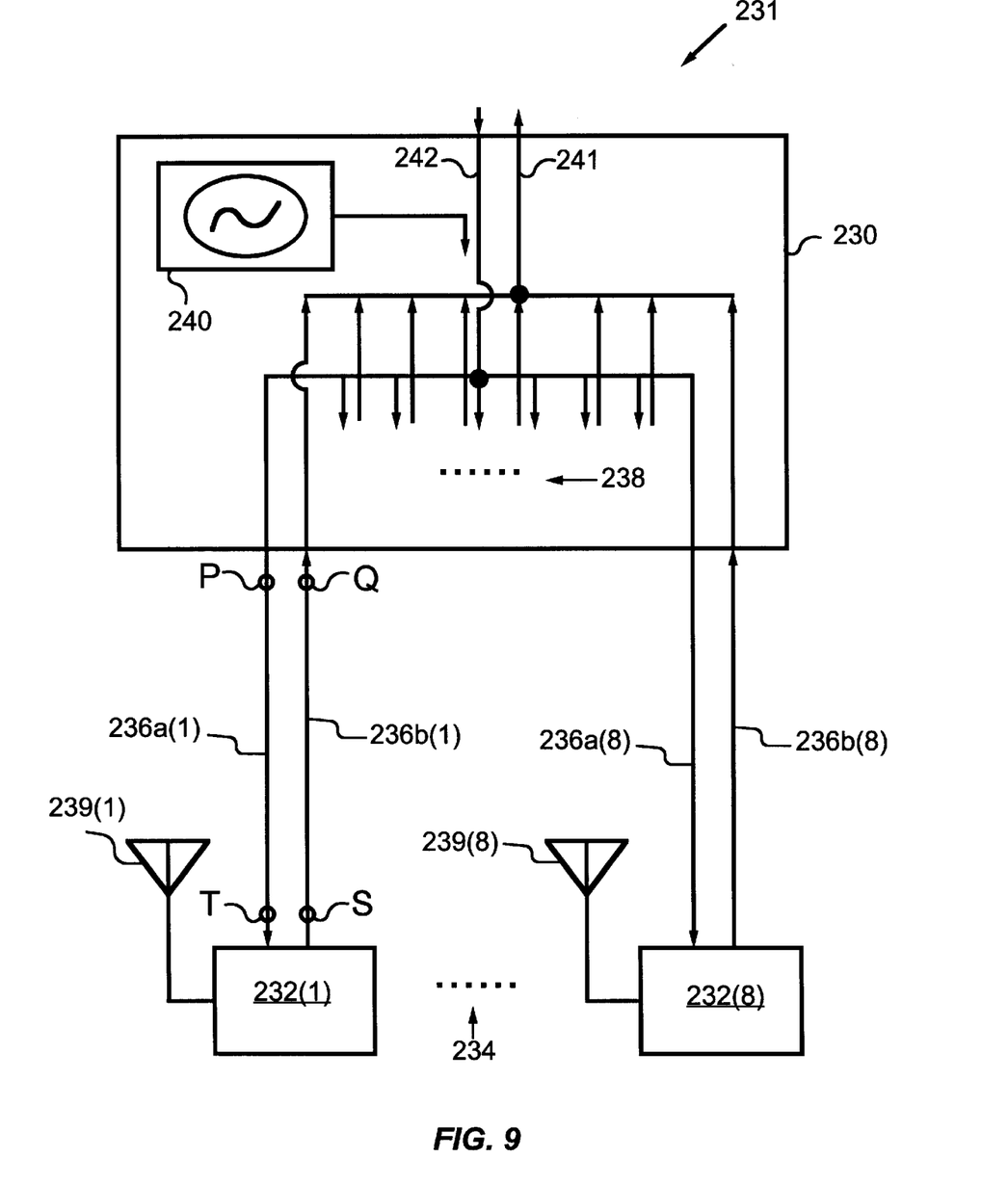
FIG. 9 depicts a cellular repeater system with fault detection system according to the invention.

The above described fault detection system and method has been implemented in a cellular radio repeater 231 whose architecture is shown in FIG. 9. System 231 has a central station 230 connected to eight identical remote communication stations 232(1), . . . , 232(8) having antennas 239 (1), . . . , 239(8). Only stations 232(1) and 232(8) are shown in FIG. 9 the remaining being indicated by dots 234. Remote stations 232(1), . . . , 232(8) have pairs of downlink and uplink connections [236a(1), 236b(1)], . . . , [236a(8), 236b(8)] between the remote stations and central station 230. Again the first and eighth pair are shown in FIG. 9 while the remaining six are indicated by dots 238. The cellular uplink band 42 is 824 MHz–849 MHz and the downlink band 40 is 869 MHz–894 MHz. These bands are indicated in FIG. 2. Test band 44 is therefore the 20 MHz region between 849 MHz and 869 MHz; test signal 46 was chosen to be a single signal at 859 MHz. These numbers are given to provide a definitive illustration of a working system according to the invention and in no way is the scope of this invention limited to these values. FIG. 9 also shows a test signal generator means 240 of this system located at central station 230. Test signal 46 is generated by 240 and fed into downlink line 242 prior to line 242 splitting into eight downlink connections 236a(1), . . . , 236a(8).

Figure 10:
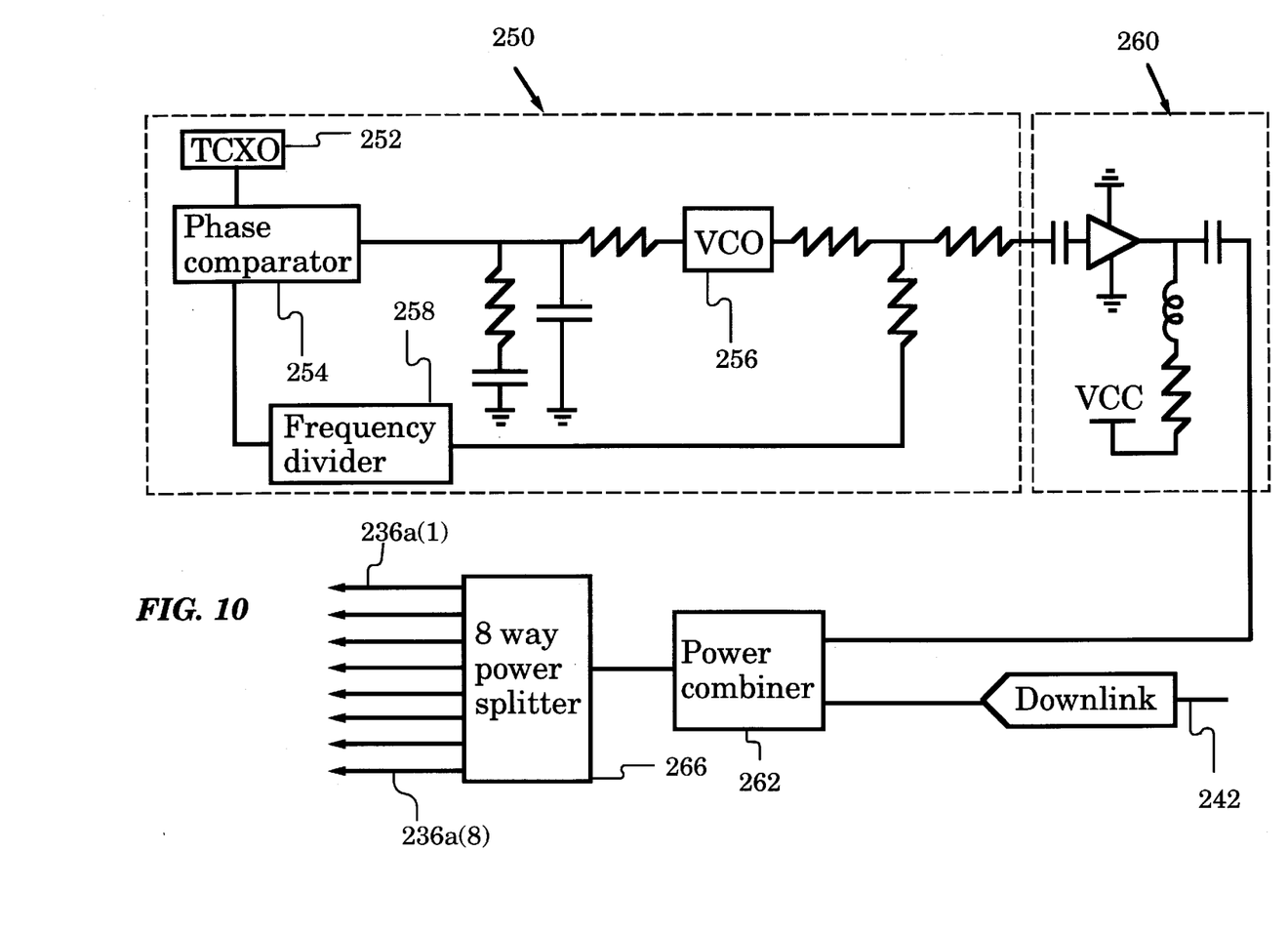
FIG. 10 is circuit schematics of a generating means for producing a test signal and combining it into a downlink path.

FIG. 10 shows in detail generator means 240 and the subsequent eight way splitting of downlink connection 242. Generator means comprises a phase-locked loop frequency generator 250, a gain stage 260, and a power combiner 262. Phase-locked loop (PLL) 250 generates a test signal 46 at frequency 859 MHz. PLL circuit 250 comprises components well known in the art, a temperature-stabilized crystal (6.711 MHz) oscillator or TCXO 252, a phase comparator 254, a voltage controlled oscillator or VCO 256 and a frequency divider 258 (dividing by 128 in this embodiment).

The output of PLL 250, test signal 46, is fed through a standard gain stage 260 and into power combiner 262. Power combiner 262 combines the output of gain stage 260 with downlink signals from downlink connection 242 and feeds the combined signals to an eight-way power splitter 266. Splitter 266 feeds the combined downlink signal and test signal 46 into each of eight downlink connections 236a (1), . . . , 236a(8). The eight downlink connections then feed into the eight remote communication stations 232(1), . . . , 232(8). Thus FIG. 10 diagrams a preferred way to generate a test signal and feed it into a downlink connection.

Implementing a fault detection scheme for system 231 which satisfies FCC regulations is now described. In cellular repeater system 231 of FIG. 9 it was determined that test signal 46 experiences a 20 dB attenuation between points T on downlink connection 236a(1) near remote station 232(1) and corresponding point S on uplink connection 236b(1). Thus test signal 46 experiences 20 dB attenuation through each of the eight identical remote stations 232(1), . . . , 232(8). In this embodiment test band 44 is regulated by the FCC which prohibits radiating test signal 46 at a power level exceeding −13 dBm/30 KHz. The test signal power radiated at a physical antenna 239(1) was measured and seen to be essentially the same power level as the power level at T of downlink connection 236a(1) to remote station 232(1). Therefore it is safe to permit the test signal power level at T to be −20 dBm (as well as on all similarly located points on downlink connections 236a(1), . . . , 236a(8)). Further there is about a 10 dB loss along cable 236a(1) between points T and P connecting remote station 232(1) to central station 230. Since there are eight remote stations 232(1), . . . , 232(8) connected to central station 230, test signal 46 generated at central station 230 must have a power level of 0 dBm to account for the 10 dB cable loss, eight-way power split and a typical 1 dB insertion loss from power combining test signal 46 into the downlink path 242.

The strength of test signal 46 entering at point T near remote stations 232(1) is −20 dBm. Since signal 46 experiences a 20 dB loss as it propagates through remote station 232(1), it will have a −40 dBm power level at point S where it is detected—unless there is a component failure somewhere along the signal path. Thus an indicator at S will signal a fault whose source is in remote station 232(1) or somewhere in its downlink path if the power level of the test signal detected at point S is significantly lower then −40 dBm. Indicators at point P can assist in further narrowing the source of faults. It is emphasized that test signal detection points T and S, although shown to lie outside of remote station 232(1) in FIG. 9, alternatively reside within station 232(1). This is illustrated in FIG. 3 for remote station 22a. Similarly points P and Q alternatively reside within station 230. In this way the detection means and indicators can be build into the communication stations.

Figure 11:
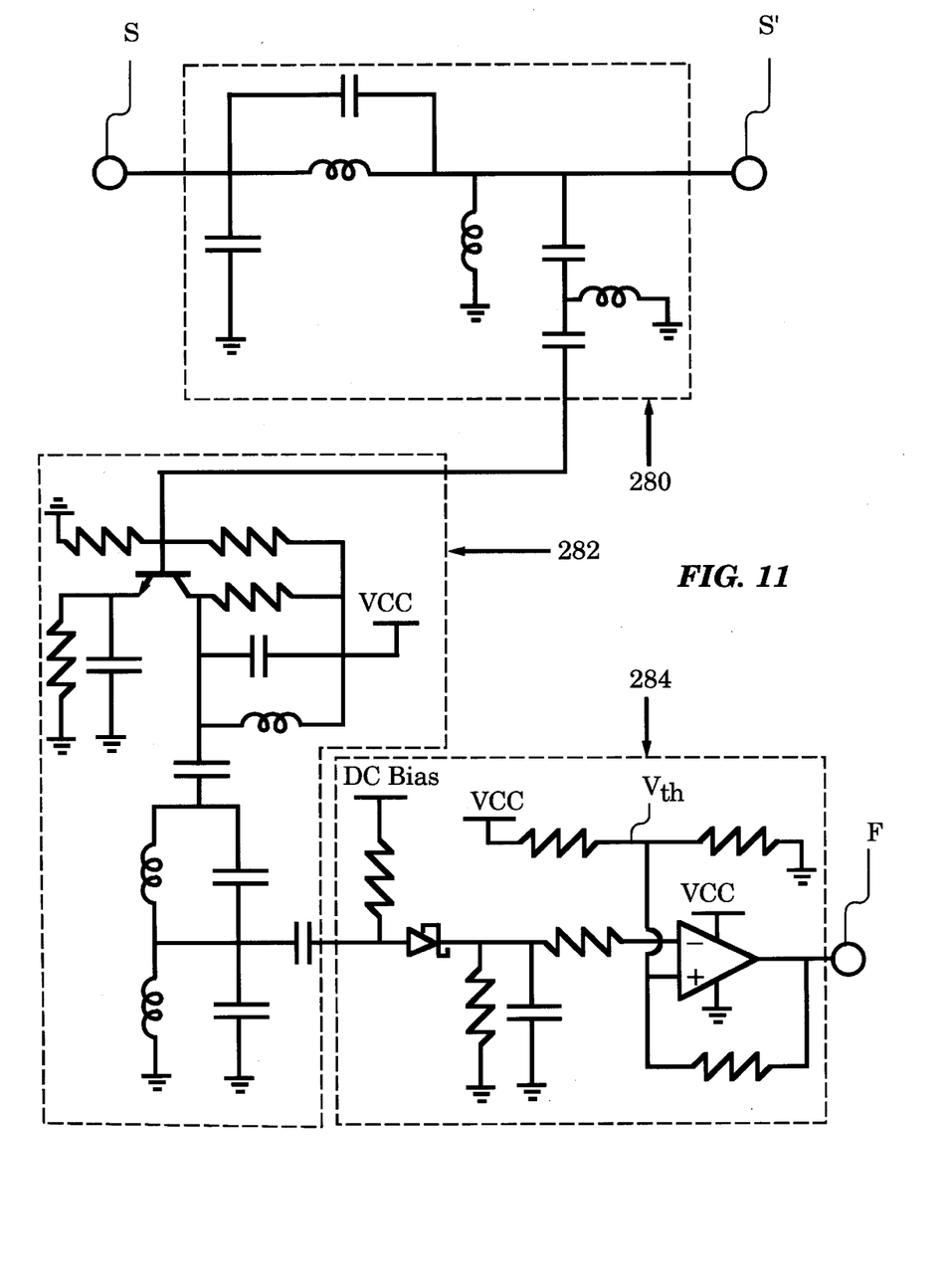
FIG. 11 is circuit schematics of detecting means for detecting a test signal power level in an uplink path.

A circuit to detect test signal 46 with a −40 dBm power level is given in FIG. 11. The circuitry is a well known construct in the art. The circuit attaches to uplink connection 236b(1) between points S and S'. This particular embodiment removes test signal 46 from all of connection 236 from S' and above and in particular uplink 241 will not pass test signal 46 out of the system 231. Detectors of high impedance or otherwise can readily be constructed by skilled artisans which leave test signal 46 within the entire uplink connection 236b(1) if desired.

The detection circuit of FIG. 11 consists of a frequency diplexer circuit 280 that splits off test signal 46 from point S and feeds it into a transistor amplifier circuit 282 matched to a high impedance detector diode circuit of detecting circuit 284. The output of detector diode circuit is fed into a voltage comparator also within 284 with a voltage threshold Vth which is set in advance. Threshold voltage Vth is chosen somewhat below the nominal voltage produced by the diode detector circuit by a −40 dBm signal in the test band 44, but above the voltage produced if there is any significant component failure. For example, if the smallest gain stage is a 15 dB low noise amplifier, then it would be reasonable to set the voltage threshold to that voltage which would be produce if the test signal strength was −45 dBm at point T. A small amount of hysteresis is included in the voltage comparator. The output of the comparator at point F is available for an indicator means, preferably an LED circuit, to flag an error or fault. More sensitive test sigal detectors can be constructed using additional amplifiers.

The method and system described above offer a relatively simple, and cost effective approach to providing powerful fault detection for bi-directional, frequency duplexed communication systems. Indeed, it is taught that according to the invention such fault detection can even be implemented on a pre-existing communication network without any additional network cabling, or limited cabling in some alternative embodiments. Although the above description includes many specifics, e.g., specific numerical values and circuitry, pertaining to implementing a fault detection method, the scope of this invention is not limited to these details. In particular, the type of test signal circuitry can vary substantially. Very low power test signal signals can perhaps be better detected with more sensitive receivers such as a homodyne detector or a matched filter. Also, other features of the test signal can be detected. For example the test signal could comprise several frequencies within the test band and one could use a detector which detects the level of attenuation of each of these frequencies. This could offer an especially robust and sensitive detection scheme. Further, it is not necessary to send the test signal through the system continuously. It can be sent in bursts and the test signal could be monitored during these burst. Also if emission at a physical antenna in the remote station are a problem, an RF switch can be opened during these bursts to isolate the test signal from the physical antenna in order to block radiation of the test signal. Alternatively, a test signal rejection filter can be placed before the antenna to prevent radiation of the test signal.

I claim:

1. In a frequency duplexed communication system operating with a downlink frequency band and an uplink frequency band, comprising a communication station having a duplexing means, said system further comprising a downlink path to said duplexing means and an uplink path from said duplexing means, a fault diagnostic system comprising:
    a) a test generating means for producing a test signal and feeding said test signal into said downlink path, said test signal having frequencies between said downlink frequency band and said uplink frequency band; and
    b) a detecting means for detecting at a point on said uplink path said test signal fed through said downlink path which leaks through said duplexing means of said communication station and into said uplink path, wherein the detected portion of said test signal indicating operability status of said frequency duplexed communication system.

2. The diagnostic system of claim 1 wherein said duplexing means comprises a downlink amplifying and filtering means with a connection to a duplexer which has a connection to an uplink amplifying and filtering means.

3. The diagnostic system of claim 1 wherein said duplexing means has a connection to an antenna wherein said test signal is re-transmitted satisfying FCC regulations.

4. The diagnostic system of claim 1 wherein the power level of the detected test signal indicates the operability status of said communication station.

5. The diagnostic system of claim 1 wherein said detecting means comprises a high impedance circuit for detecting the test signal at said point on said uplink path, whereby the test signal continues to travel up the uplink path away from said communication station.

6. The diagnostic system of claim 1 wherein said detecting means removes substantially all of said test signal from above said point on said uplink path.

7. The diagnostic system of claim 1 further comprising a fault indicating means indicating a fault when the power level of the detected test signal is not substantially equal to a predetermined value.

8. The diagnostic system of claim 1 wherein a second detecting means detects said test signal in said downlink path.

9. The diagnostic system of claim 8 wherein the second detecting means further comprises a fault indication means which indicates the operability status of a portion of said frequency duplexed communication system above said communication station along said downlink path.

10. The diagnostic system of claim 8 further comprising a detection comparison means comparing the detected test signal on the uplink path to the detected test signal on the downlink path.

11. The diagnostic system of claim 10 further comprising a fault indication means indicating the operability status of said communication station.

12. The diagnostic system of claim 1 wherein said test generating means feeds said test signal into said downlink path at a central station of said frequency duplexed communication system.

13. The diagnostic system of claim 1 wherein said test generating means feeds said test signal into said downlink path near an intermediate station of said communication system.

14. A method of fault diagnostics for a frequency duplexed communication network operating on a downlink frequency band and an uplink frequency band, said communication network comprising a downlink path and an uplink path, said uplink path and said downlink path having a coupling means allowing signals of frequencies between said uplink frequency band and said downlink frquency band to travel from said downlink path to said uplink path, said method comprising the following steps:

a) feeding a test signal into said downlink path, said test signal having frequencies between said downlink frequency band and said uplink frequency band; and     b) detecting on said uplink path said test signal fed through said downlink path which leaks through said coupling means and into said uplink path, wherein the detected test signal indicating operability status of said frequency duplexed communication network.

15. The method of claim 14 wherein step (b) the power level of the detected test signal on said uplink path is compared to the power level of said test signal entering said downlink path and the outcome of said comparison indicating the operability status of said frequency duplexed communication network.

16. The method of claim 14 wherein said coupling means comprises a duplexing means of a remote communication station.

17. The method of claim 14 wherein said coupling means comprises a coupling link between said downlink path and said uplink path.

18. In a frequency duplexed communication network, operating with a downlink frequency band and an uplink frequency band, a fault diagnostic system for a branch of said communication network, said branch comprising a principal communication station having a principal downlink connection and a principal uplink connection to said network, said branch further comprising a secondary downlink connection and a secondary uplink connection from said principal communication station, said fault diagnostic system comprising:

a) a test signal generating means for producing a test signal and feeding said test signal into said branch through said principal downlink connection of said branch whereupon said test signal travels into said principal communication station and into said secondary downlink connection, said test signal having frequencies between said downlink frequency band and said uplink frequency band;

b) a coupling means between said secondary downlink connection and said secondary uplink connection whereby signals having frequencies between said downlink frequency band and said uplink frequency band may leak through to said secondary uplink connection; and     c) a detecting means for detecting said test signal which leaks through said coupling means to said secondary uplink connection.

19. The diagnostic system of claim 18 wherein the power level of the detected test signal indicates the operability of said branch.

20. The diagnostic system of claim 18 wherein said coupling means comprises a remote communication station having a duplexing means.

21. The diagnostic system of claim 20 wherein said detecting means detects said test signal on said secondary uplink connection near said remoted communication station.

22. The diagnostic system of claim 21 wherein said detecting means removes substantially all of said test signal from said secondary uplink connection.

23. The diagnostic system of claim 18 wherein said coupling means comprises an intermediate station wherein said downlink connection to said intermediate station is coupled to said uplink connection to said intermediate station.

24. The diagnostic system of claim 23 wherein said detecting means detects said test signal on said secondary uplink connection near said intermediate station.

25. The diagnostic system of claim 18 wherein said principal communication station is selected from the group of communication stations consisting of a central station and an intermediate station.

26. The diagnostic system of claim 18 wherein the detected test signal is detected in said secondary uplink connection near said principal communication station.

27. The diagnostic system of claim 18 wherein the test signal which leaks into said secondary uplink connection further travels into said principal uplink connection and is detected in said principal uplink connection.

28. The diagnostic system of claim 18 further comprising a second detection means detecting the test signal on said principal downlink connection.

29. The diagnostic system of claim 18 further comprising a second detection means detecting the test signal on said secondary downlink connection.

30. The diagnostic system of claim 18 wherein said detecting means detects said test signal on said secondary uplink connection near said coupling means.

31. The diagnostic system of claim 30 further comprising an indication means located on said secondary uplink connection near said principal communication station indicating the results of said detecting means.

32. The diagnostic system of claim 18 wherein said principal communication station further comprising a plurality of secondary uplink connections and secondary downlink connections.

\* \* \* \* \*